Patented Mar. 11, 1947

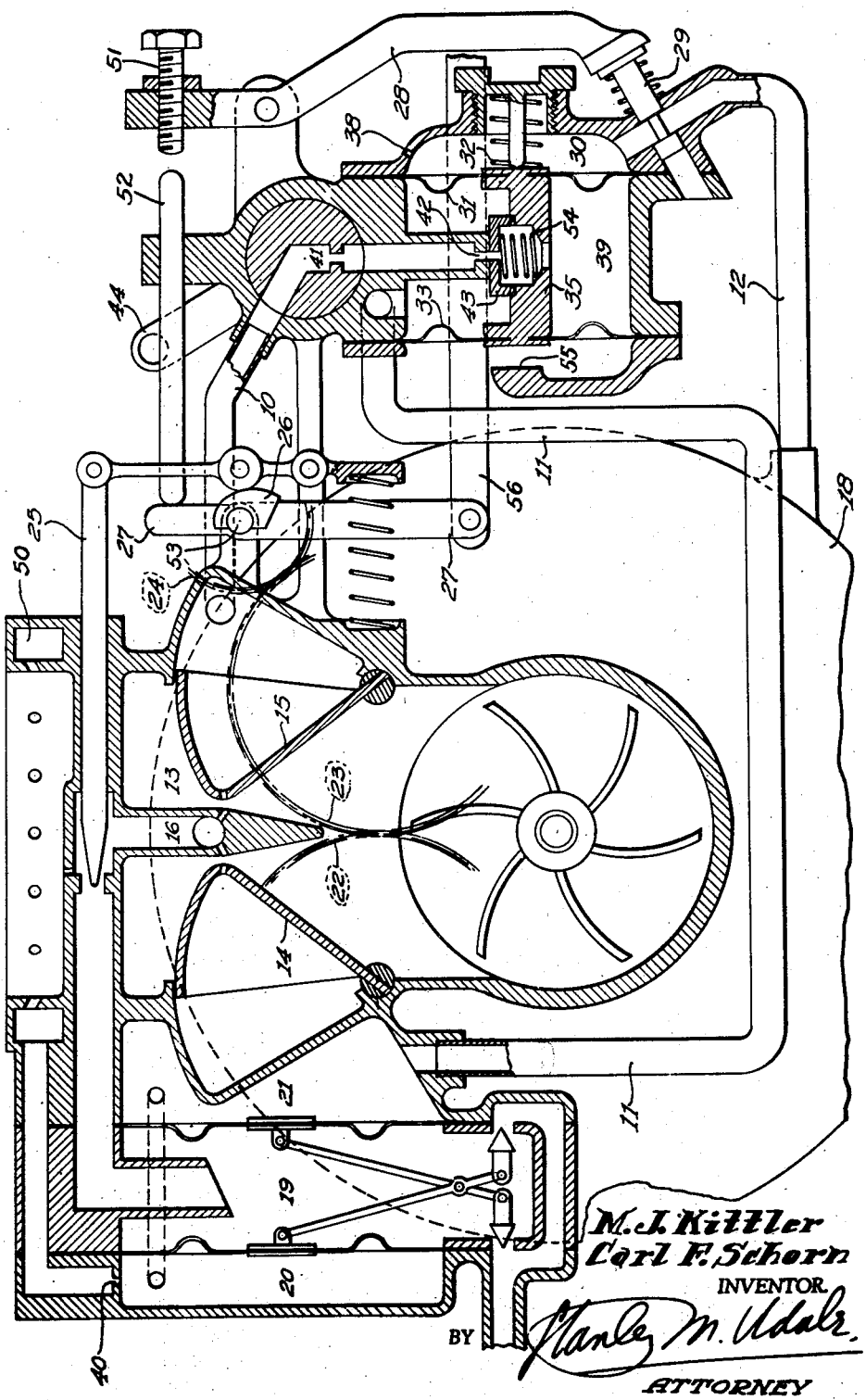

2,417,304

UNITED STATES PATENT OFFICE 2,417,304

MIXTURE CONTROL DEVICE

Milton J. Kittler and Carl F. Schorn, Detroit, Mich., assignors to George M. Holley and Earl Holley Application July 19, 1944, Serial No. 545,668

4 Claims. (Cl. 261—72)

1

The object of this invention is to reduce fuel consumption during the cruising range.

An additional object is to increase the fuel air ratio when operating at a lower speed than cruising—for example, when idling.

When operating at near maximum power, maximum fuel is required, as any attempt to obtain maximum power with minimum fuel air ratio will burn out the valves and wreck the engine.

The figure shows a cross-sectional elevation of the fuel economizer valve and as background the carburetor itself is shown diagrammatically.

In the diagram, 13 is the air entrance, 14 and 15 are the streamlined throttles which with the nozzle 16 forms a variable venturi. 17 is an opening in the throttle 15, which communicates Venturi suction to the mixture control device through the pipe 10.

The air flows to a supercharger 18, and the pressure created in this supercharger is transmitted through pipe 12 to the mixture control device.

The fuel is supplied from the diaphragm fuel chamber 19, and the pressure in this chamber 19 is controlled by the air pressure in the chambers 20 and 21, which are in communication with each other.

The pressure in these chambers is controlled by the pressure in the air entrance annular chamber 50 through a restriction 40. The mixture control device, the subject of this application, is connected to the chambers 20 and 21 through the pipe 11.

Throttles 14 and 15 are geared together by the gears 22 and 23. Gear 24 engages with gear 23 and moves the fuel needle valve 25 by means of a cam 26 moved by a throttle lever 27.

Moving line 56 to the left causes the clockwise rotation of throttle lever 27 around an axis 53 of the cam 26 and also closes the throttles 14 and 15. The threaded adjustment of a bolt 51 provided on the upper end of lever 28 by engaging with a rod 52 also closes the valve 29 so as to stop the flow of air through a pipe 12, which is connected to the outlet from the supercharger 18, so that the supercharger pressure has no longer any influence on the mixture control device.

Until the valve 29 is closed by the rod 52 and adjustable bolt 51 and by the clockwise rotation of the lever 27 around pivot 53 and lever 28, supercharger pressure exists in the chamber 30. When the valve 29 is closed by rod 52 engaging with adjustable bolt 51, atmospheric pressure is

2 re-established in chamber 30 through a small air passage 38. A bridge element 35 is carried by the two diaphragms 33 and 31, and it carries a valve 43 and a spring 54, which pushes the valve 43 up against the valve seat surrounding the opening 42.

In the position shown, the throttles 14 and 15 are almost in the idling position so that the supercharger is creating a pressure very much less than atmospheric. Hence, as the diaphragm 33 is subjected to atmospheric pressure, it pushes the valve 43 to the right so that the valve 43 keeps the opening 42 in line with the opening in valve 43, and this applies venturi suction from the throat 14—15, pipe 10, valve 11 and then through the pipe 11 to the chamber 20—21 so as to reduce the fuel flow.

The moment the valve 29 closes, the spring 32 is the only force active, as the pressure on diaphragm 31 equals the pressure on diaphragm 33. Hence, valve 43 moves to the left and closes the opening at 42; hence, the mixture becomes normal. When throttle lever 27 is moved counter-clockwise around pivot 53 to open the throttles, the engine increases in speed and with it the supercharger. Then the sub-atmospheric pressure imposed on chamber 30 is transformed and eventually rises so as to equal atmospheric pressure when the spring 32 pushes the valve 43 to the left and again the opening 42 is closed and again the mixture becomes normal. This takes place just before the supercharger generates a pressure equal to atmosphere, because the spring 32 is equivalent to a pressure of 2" of mercury.

A stop 55, which limits the travel of the valve 43 and bridge element 35 to the left, has no function except to prevent strain on the diaphragms 31 and 33. It will be noted that the super-atmospheric pressure of the supercharger 18 never has any effect on the movement of the valve 43, because before such a pressure is generated, the valve 43 has moved. Atmospheric pressure acting on diaphragm 33 opens the valve 43. The spring 32 closes valve 43.

The valve 41 is a manually operated valve operated by a lever 44, which can be used to disconnect the venturi suction in pipe 10 from the mixture control device.

Operation

In the normal operation, the valve 29 is wide open and the diaphragm 31 responds to the supercharger pressure. If the pressure falls below 28" Hg. of mercury, the diaphragm 33, being at 30" Hg. (sea level) drags the valve 43 into line, allowing 2″ of mercury for the spring 32 and assuming a barometer 30, so that the suction in the passage 10 is now transmitted through the valves 41 and 43 to the pipe 11 and so to the air chambers 20 and 21 so that the fuel air ratio is held at a minimum until such time as the throttles are opened up when the mixture ratio is immediately restored to normal by the action of the supercharger pressure, which pushes the valve 43 to the left. The mixture ratio is restored to normal because the pressure in the chambers 20 and 21 is equal to the pressure in chamber 50, because suction created in throat 14—15 is no longer applied through restrictions 41 and 42 to cause a flow of air through restriction 40 to lower the pressure in chamber 20—21. Whenever the throttle moves to the idle position when the valve 29 cuts off flow through the pipe 12 for the same reason the mixture is reduced to normal as the valve 43 is moved to the left by the spring 32. The small opening 38 admits atmospheric pressure to the chamber 30 so that any suction in chamber 30 quickly disappears after valve 29 is closed.

It must be understood that super-atmospheric pressure is never responsible for the movement of the valve 43; the supercharger merely restores the pressure in the pipe 12 to a pressure equal that in the air entrance (chamber 50) less that equal to spring 32, which is equal to 2″ Hg. When this happens, the throttles 14 and 15 are then more open than as shown. The pressure of the atmosphere acting on the left of the diaphragm 33 is substantially equal to that in the chamber 50, which is the pressure in the air entrance. It is this pressure which opens the valve 43. The spring 32 closes the valve 43. As no provision has been made for altitude, this specific invention is intended for low flying aircraft and for marine engines.

What we claim is:

1. In an internal combustion engine having a carburetor, air throttling means for said carburetor of the variable Venturi type, a fuel supply chamber, a diaphragm on one side of said chamber, an air chamber on the other side of said diaphragm, a restricted air passage connecting the air chamber with air at the atmospheric pressure of the entering air, a second restricted air passage connecting the air chamber with the suction created by said engine in the throat of the variable venturi formed by said throttle, an automatic valve adapted to open and close said second passage, a second air chamber, a moving wall therefor connected to said automatic valve and responsive on one side to atmospheric pressure, an unrestricted air passage connecting said second air chamber to the engine side of said throttle, spring means for moving said valve so that when the throttle approaches its closed position, the engine suction resulting therefrom moves said moving wall and said automatic valve against the action of said spring to open said second passage and when the throttle approaches its open position, the higher pressure resulting therefrom permits said automatic valve to be moved in response to said spring to close said second passage.

2. A device as set forth in claim 1 in which there is a shut-off valve in said unrestricted air passage and a restricted air passage connecting said second air chamber to the atmosphere and a mechanical connection from the throttle to said shut-off valve arranged so as to close said unrestricted air passage and thus permit the atmospheric pressure acting through said restricted opening to push said automatic valve so as to close said second restricted air passage when the throttle is moved to its idle position.

3. A device as set forth in claim 1 in which there is a manually controlled shut-off valve arranged in series with said automatic air valve in said second air passage.

4. A device as set forth in claim 1 in which there is a shut-off valve in said unrestricted air passage and a restricted air passage connecting second air chamber to the atmosphere and a mechanical connection from the throttle to said shut-off valve arranged so as to close said unrestricted air passage and thus permit the atmospheric pressure acting through said restricted opening to push said automatic valve so as to close said second restricted air passage when the throttle is moved to its idle position and a second manually controlled shut-off valve arranged in series with said automatic valve in said second air passage.

MILTON J. KITTLER.
CARL F. SCHORN.

REFERENCES CITED

The following references are of record in the file of this patent:

UNITED STATES PATENTS

| Number | Name | Date |
|---|---|---|
| 2,228,000 | Chandler | Jan. 7, 1941 |
| 2,159,173 | Mennesson | May 23, 1939 |
| 2,232,392 | Kittler | Feb. 18, 1941 |
| 1,979,834 | Jenks | Nov. 6, 1934 |
| 1,945,189 | Goodman | Jan. 30, 1934 |
| 1,948,135 | Sands | Feb. 20, 1934 |